United States Patent
Bouchard

(10) Patent No.: US 11,835,147 B2
(45) Date of Patent: Dec. 5, 2023

(54) BACKFLOW PREVENTION ASSEMBLY HAVING A CARTRIDGE WITH DUAL ZONE TESTING

(71) Applicant: Watts Regulator Co., North Andover, MA (US)

(72) Inventor: Peter P. Bouchard, Ayer, MA (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 18/021,124

(22) PCT Filed: Aug. 16, 2021

(86) PCT No.: PCT/US2021/046101
§ 371 (c)(1),
(2) Date: Feb. 13, 2023

(87) PCT Pub. No.: WO2022/040071
PCT Pub. Date: Feb. 24, 2022

(65) Prior Publication Data
US 2023/0228067 A1 Jul. 20, 2023

Related U.S. Application Data

(60) Provisional application No. 63/066,411, filed on Aug. 17, 2020.

(51) Int. Cl.
*E03B 7/07* (2006.01)
*F16K 15/06* (2006.01)
(Continued)

(52) U.S. Cl.
CPC ............ *F16K 15/066* (2013.01); *E03B 7/077* (2013.01); *E03C 1/106* (2013.01); *E03F 7/04* (2013.01);
(Continued)

(58) Field of Classification Search
CPC ................. F16K 15/035; F16K 15/066; F16K 2200/501; E03B 7/077
See application file for complete search history.

(56) References Cited

U.S. PATENT DOCUMENTS

| 213,394 A | 3/1879 | Cornwal |
| 623,418 A | 4/1899 | O'Meara |

(Continued)

FOREIGN PATENT DOCUMENTS

| CN | 110081212 A | 8/2019 |
| DE | 1925477 A1 | 12/1970 |

(Continued)

OTHER PUBLICATIONS

International Search Report and Written Opinion issued in corresponding International Patent Application No. PCT/US2021/046101, dated Nov. 22, 2021, 8 pages.

(Continued)

*Primary Examiner* — Kevin F Murphy
(74) *Attorney, Agent, or Firm* — Day Pitney LLP; George Chaclas; Anthony A. Kassas

(57) ABSTRACT

A backflow prevention assembly includes a body forming two buckets, wherein flow passes through the body from an inlet to an outlet along an axis and consecutively through each of the buckets. A single zone test cover encloses a first of the buckets to form a single zone chamber. A dual zone test cover encloses a second of the buckets with a dual zone cartridge assembly therein. The dual zone test cover has two test cocks. The dual zone cartridge assembly includes a frame having a valve seat, wherein the frame includes a lumen providing fluid communication from a dual zone chamber upstream of the valve seat to a first of the two test cocks of the dual zone test cover, and wherein the second of the two test cocks of the dual zone test cover is in fluid (Continued)

communication with the dual zone chamber downstream of the valve seat.

8 Claims, 7 Drawing Sheets

(51) Int. Cl.
| | |
|---|---|
| *E03F 7/04* | (2006.01) |
| *F16K 27/02* | (2006.01) |
| *E03C 1/10* | (2006.01) |
| *F16K 27/12* | (2006.01) |
| *F16K 15/03* | (2006.01) |
| *F16K 37/00* | (2006.01) |
| *F16K 17/30* | (2006.01) |

(52) U.S. Cl.
CPC .......... *F16K 15/033* (2013.01); *F16K 15/035* (2013.01); *F16K 27/0209* (2013.01); *F16K 27/12* (2013.01); *F16K 17/30* (2013.01); *F16K 37/0091* (2013.01); *F16K 2200/501* (2021.08)

(56) References Cited

U.S. PATENT DOCUMENTS

| | | | |
|---|---|---|---|
| 953,940 A | 4/1910 | Beam | |
| 2,310,586 A | 2/1943 | Lohman | |
| 2,514,374 A | 7/1950 | Cooper | |
| 2,827,921 A | 3/1958 | Sherman et al. | |
| 3,173,439 A | 3/1965 | Griswold et al. | |
| 3,189,037 A | 6/1965 | Modesto | |
| 3,429,291 A | 2/1969 | Hoffman | |
| 3,570,537 A | 3/1971 | Kelly | |
| 3,817,278 A | 6/1974 | Elliott | |
| 3,837,357 A | 9/1974 | Slaughter | |
| 3,837,358 A | 9/1974 | Zieg et al. | |
| 3,859,619 A | 1/1975 | Ishihara et al. | |
| 3,896,850 A | 7/1975 | Waltrip | |
| 3,905,382 A | 9/1975 | Waterston | |
| 3,906,987 A | 9/1975 | Rushforth et al. | |
| 3,996,962 A | 12/1976 | Sutherland | |
| 4,014,284 A | 3/1977 | Read | |
| 4,244,392 A | 1/1981 | Griswold et al. | |
| 4,284,097 A | 8/1981 | Becker et al. | |
| 4,416,211 A | 11/1983 | Hoffman | |
| 4,453,561 A | 6/1984 | Sands | |
| 4,489,746 A | 12/1984 | Daghe et al. | |
| 4,523,476 A | 6/1985 | Larner | |
| 4,618,824 A | 10/1986 | Magee et al. | |
| 4,667,697 A | 5/1987 | Crawford | |
| 4,694,859 A | 9/1987 | Smith, III | |
| 4,776,365 A | 10/1988 | Bathrick et al. | |
| 4,777,979 A | 10/1988 | Twerdochlib | |
| 4,920,802 A | 5/1990 | McMullin et al. | |
| 4,945,940 A | 8/1990 | Stevens | |
| 5,008,841 A | 4/1991 | McElroy | |
| 5,024,469 A | 6/1991 | Aitken et al. | |
| 5,072,753 A | 12/1991 | Ackroyd | |
| 5,125,429 A | 6/1992 | Ackroyd et al. | |
| 5,236,009 A | 8/1993 | Ackroyd | |
| 5,299,718 A | 4/1994 | Shwery | |
| 5,404,905 A | 4/1995 | Lauria | |
| 5,425,393 A | 6/1995 | Everett | |
| 5,452,974 A | 9/1995 | Binns | |
| 5,520,367 A | 5/1996 | Stowers | |
| 5,551,473 A | 9/1996 | Lin et al. | |
| 5,566,704 A | 10/1996 | Ackroyd et al. | |
| 5,584,315 A | 12/1996 | Powell | |
| 5,586,571 A | 12/1996 | Guillermo | |
| 5,669,405 A | 9/1997 | Engelmann | |
| 5,711,341 A | 1/1998 | Funderburk et al. | |
| 5,713,240 A | 2/1998 | Engelmann | |
| 5,901,735 A | 5/1999 | Breda | |
| 5,918,623 A | 7/1999 | Hidessen | |
| 5,947,152 A | 9/1999 | Martin et al. | |
| 5,992,441 A | 11/1999 | Enge et al. | |
| 6,021,805 A * | 2/2000 | Horne | E03C 1/106 251/367 |
| 6,123,095 A | 9/2000 | Kersten et al. | |
| 6,155,291 A | 12/2000 | Powell | |
| 6,170,510 B1 | 1/2001 | King et al. | |
| 6,343,618 B1 | 2/2002 | Britt et al. | |
| 6,349,736 B1 | 2/2002 | Dunmire | |
| 6,374,849 B1 | 4/2002 | Howell | |
| 6,378,550 B1 | 4/2002 | Herndon et al. | |
| 6,443,184 B1 | 9/2002 | Funderburk | |
| 6,471,249 B1 | 10/2002 | Lewis | |
| 6,513,543 B1 | 2/2003 | Noll et al. | |
| 6,546,946 B2 | 4/2003 | Dunmire | |
| 6,581,626 B2 | 6/2003 | Noll et al. | |
| 6,659,126 B2 | 12/2003 | Dunmire et al. | |
| 6,675,110 B2 | 1/2004 | Engelmann | |
| 7,051,763 B2 | 5/2006 | Heren | |
| 7,114,418 B1 | 10/2006 | Allen | |
| 7,434,593 B2 | 10/2008 | Noll et al. | |
| 7,506,395 B2 | 3/2009 | Eldridge | |
| 7,784,483 B2 * | 8/2010 | Grable | E03B 7/077 137/315.33 |
| 7,934,515 B1 | 5/2011 | Towsley et al. | |
| 8,220,839 B2 | 7/2012 | Hall | |
| 8,997,772 B2 | 4/2015 | Noll et al. | |
| 9,091,360 B2 | 7/2015 | Frahm, II | |
| 9,546,475 B2 | 1/2017 | Lu | |
| 9,899,819 B1 | 2/2018 | Holloway | |
| 9,995,605 B2 | 6/2018 | Konno et al. | |
| 10,132,425 B2 | 11/2018 | Di Monte, Sr. | |
| 10,561,874 B2 | 2/2020 | Williams et al. | |
| 10,719,904 B2 | 7/2020 | Yasumuro et al. | |
| 10,883,893 B2 | 1/2021 | Shaw, Jr. et al. | |
| 10,914,412 B2 | 2/2021 | Doughty et al. | |
| 10,962,143 B2 | 3/2021 | Cis et al. | |
| 11,137,082 B2 | 10/2021 | Okuno et al. | |
| 2002/0043282 A1 | 4/2002 | Horne et al. | |
| 2002/0078801 A1 | 6/2002 | Persechino | |
| 2003/0000577 A1 | 1/2003 | Noll et al. | |
| 2003/0168105 A1 | 9/2003 | Funderburk | |
| 2004/0045604 A1 | 3/2004 | Dunmire et al. | |
| 2004/0107993 A1 | 6/2004 | Stephens | |
| 2005/0092364 A1 | 5/2005 | Furuya et al. | |
| 2005/0199291 A1 | 9/2005 | Price et al. | |
| 2006/0076062 A1 | 4/2006 | Andersson | |
| 2006/0196542 A1 | 9/2006 | Yen | |
| 2007/0181191 A1 | 8/2007 | Wittig et al. | |
| 2007/0193633 A1 | 8/2007 | Howell et al. | |
| 2007/0204916 A1 | 9/2007 | Clayton et al. | |
| 2007/0204917 A1 | 9/2007 | Clayton et al. | |
| 2007/0240765 A1 | 10/2007 | Katzman et al. | |
| 2008/0145739 A1 | 6/2008 | Adams et al. | |
| 2008/0289567 A1 | 11/2008 | Gordon | |
| 2009/0136935 A1 | 5/2009 | Petersen | |
| 2009/0194719 A1 | 8/2009 | Mulligan | |
| 2011/0067225 A1 | 3/2011 | Bassaco | |
| 2011/0309076 A1 | 12/2011 | Liebenberg et al. | |
| 2012/0248759 A1 | 10/2012 | Feith | |
| 2013/0026743 A1 | 1/2013 | Baca | |
| 2013/0255452 A1 | 10/2013 | Kovach | |
| 2014/0109986 A1 | 4/2014 | Cordes | |
| 2017/0023141 A1 | 1/2017 | Andersson | |
| 2018/0156488 A1 | 6/2018 | Evans et al. | |
| 2019/0043157 A1 | 2/2019 | Yasumuro et al. | |
| 2019/0136935 A1 | 5/2019 | Hulstein et al. | |
| 2019/0162341 A1 | 5/2019 | Chiproot | |
| 2019/0271428 A1 | 9/2019 | O'Connor et al. | |
| 2019/0323618 A1 | 10/2019 | Fletcher et al. | |
| 2020/0141612 A1 | 5/2020 | Thibodeaux, Jr. | |
| 2020/0370677 A1 | 11/2020 | Mendez | |
| 2021/0172157 A1 | 6/2021 | Burke et al. | |

(56) References Cited

U.S. PATENT DOCUMENTS

| | | |
|---|---|---|
| 2021/0230850 A1 | 7/2021 | Bouchard et al. |
| 2021/0332898 A1 | 10/2021 | Cellemme |

FOREIGN PATENT DOCUMENTS

| | | |
|---|---|---|
| DE | 8525261 U1 | 11/1985 |
| DE | 202014102568 U1 | 9/2015 |
| EP | 1521004 A1 | 4/2005 |
| EP | 3434833 A1 | 1/2019 |
| EP | 3832183 A1 | 6/2021 |
| FR | 2928750 A1 | 9/2009 |
| GB | 1231579 A | 11/1967 |
| JP | 2002213629 | 7/2002 |
| WO | 2003060459 A1 | 7/2003 |
| WO | 2020023584 A1 | 1/2020 |

OTHER PUBLICATIONS

Ames Fire & Waterworks, division of Watts Industries, F-A-Spools/Flanges, 2001, 4 pages.

Apollo Valves PVB4A Series Installation, Operation and Maintenance Manual for Model PVB4A ½"-2" Pressure Vacuum Breaker Backflow Preventer, dated Jan. 11, 2012, 12 pages.

Apollo Valves PVB4A Series Installation, Operation, and Maintenance Manual, copyright May 2009, 9 pages.

Apollo Valves, Apollo backflow preventer in-line "R" retrofit series, dated Jul. 29, 2016, 2 pages.

Conbraco BFMMPVB Maintenance Manual for Series 4V-500 ½"-2" Pressure Type Vacuum Breaker, 04/02, Conbraco Industries, Inc., Matthews, North Carolina 28106, 6 pages.

European Search Report for European Patent Application No. 20192133.5 dated Feb. 1, 2021, 9 pages.

Extended European Search Report received for European Patent Application No. 20211811.3, dated May 4, 2021, 8 pages.

International Search report and Written Opinion issued in corresponding International patent Application No. PCT/US2021/046208, dated Dec. 1, 2021, 8 pages.

International Search Report and Written Opinion issued in corresponding International Patent Application No. PCT/US2021/062395, dated Feb. 23, 2022, 14 pages.

Lead Free Master Series LF870V product specifications pages, ES-F-LF-870V 1826, 2018, 4 pages.

Miscellaneous Communication issued in European patent application No. 20211811.3, dated May 4, 2021, 8 pages.

Watt TK-99E Backflow Preventer Test Kit Product Specifications and Test Information, IS-TK99E 0829, 2009, 4 pages.

Watts Regulator Co., WATTS ACV 113-6RFP Flood Protection Shutdown Valve for health Hazard Applications, 2020, 4 pages.

Watts Water Company, Series 909RPDA for Health Hazard Applications, 2016, 4 pages.

Watts Water Technologies Company Brochure ES LF800M4QT for Health Hazard Applications Lead Free Series LF8 M4QT Anti-Siphon Vacuum Breakers Sizes ½"-2", copyright 2013, 4 pages.

Watts Water Technologies Company, Installation, Maintenance & repair Series 909, LF909, 909RPDA, LF909RPDA, 2016, 8 pages.

Watts, "Double Check Valve Assembly Backflow Preventers, Bronze," Article 1, 2021, 6 pages.

Watts, "Reduced Pressure Zone Assembly Backflow Preventers, Bronze Body, Sizes ¼-2 IN," Article 1, 2021, 16 pages.

Watts, S-RetroFit-Simple, 2017, 2 pages.

Wilkins Company, Model 375/475MS Series, Installation, Maintenance and Instruction Sheet, 2006, 1 page.

Wilkins Model 420 XL Lead-Free pressure Vacuum Breakers ½", ¾", and 1" (date unknown), 2 pages.

Zurn Wilkins 300AR Series, Backflow Preventor Order Form No. 480-060, 4117, Apr. 2017, 2 pages.

EP Communication pursuant to Article 94(3) EPC for corresponding Application No. 20211811.3 dated Mar. 3, 2023; 7 pgs.

\* cited by examiner

BACKFLOW PREVENTION ASSEMBLY HAVING A CARTRIDGE WITH DUAL ZONE TESTING

CROSS-REFERENCE TO RELATED APPLICATIONS

This application is a U.S. National Stage Application under 35 U.S.C. 371 International Application No. PCT/US2021/046101 filed on Aug. 16, 2021, which claims the benefit and priority of U.S. Provisional Patent Application No. 63/066,411 filed on Aug. 17, 2020, the contents of each are incorporated by reference herein in their entirety for any purpose whatsoever.

FIELD OF THE DISCLOSURE

The subject disclosure relates to backflow prevention valves and assemblies, and more particularly to backflow prevention valves and assemblies having a check valve assembly with dual zone test capability.

BACKGROUND

In many water systems, backflow prevention (BFP) assemblies allow fluid and even solids to flow only in a desired, i.e., a forward, direction. As backsiphonage or backflow can present contamination and health problems, the backflow prevention valves and assemblies prevent flow in an undesired direction, i.e., a backward or reverse direction. BFP assemblies are installed in buildings, such as residential homes, and commercial buildings and factories, to protect public water supplies by preventing the reverse flow of water from the buildings back into the public water supply.

A typical BFP assembly includes an inlet shutoff valve and an outlet shutoff valve with a backflow prevention valve assembly extending between the inlet and outlet shutoff valves. Many different configurations of BFP assemblies are commercially available, each being differently configured.

Owing to the fact that BFP assemblies are important for water safety, BFP units are tested annually, often per government regulations, to assure proper operating condition. Specifically, fluid pressure measurements are taken at specified locations in the BFP unit. If it is determined that a check valve needs to be repaired or replaced, the inlet and outlet shutoff valves have to be closed, the check valve fixed and tested, the shutoff valves opened and the apparatus confirmed to be operating per any required ordinances and/or standards. The process is time-consuming and the steps have to be performed in the correct sequence and manner in order to not contaminate the public water supply, inadvertently flood an area, and return the BFP assembly to working order.

Examples of BFP assemblies are shown in U.S. Pat. No. 6,581,626 issued on Jun. 24, 2003 to Noll et al. and U.S. Pat. No. 6,513,543 issued on Feb. 4, 2003 to Noll et al., each of which is incorporated herein by reference. These references disclose BFP assemblies with three taps or test cocks spread out along the BFP assembly body for checking pressures around the two horizontally actuating check valves. As a result, the BFP assemblies are unduly elongated.

SUMMARY

From time to time, various components of a BFP assembly may need replacement, which is not only difficult and time consuming but results in downtime for the fluid network. A cartridge assembly for the check valve assemblies that are easier to manufacture, assemble and install as well as more robust would reduce: the difficulty of fabrication and repair; repair time; assembly error from improper fabrication or otherwise; and the difficulty of installation. Further, a more compact and functional cartridge assembly and BFP assembly would save space and materials cost. The subject technology provides some or all of these benefits along with reducing the required components.

The subject technology is directed to a backflow prevention (BFP) assembly including a body forming an upstream bucket and a downstream bucket, wherein flow passes through the body from an inlet to an outlet along an axis and consecutively through each of the upstream and downstream buckets. A single zone test cover encloses a first of the buckets to form a single zone chamber, the single zone test cover having a test cock in fluid communication with the single zone chamber. A single zone cartridge assembly in the first of the buckets includes a frame having a valve seat, a valve member to selectively seal against the valve seat in a closed position, and a spring urging the valve member into the closed position. A dual zone test cover encloses a second of the buckets to form a dual zone chamber, the dual zone test cover having two test cocks. A dual zone cartridge assembly in the second of the buckets includes a frame having a valve seat, wherein the frame includes a lumen providing fluid communication from the dual zone chamber upstream of the valve seat to a first of the two test cocks of the dual zone test cover, and wherein the second of the two test cocks of the dual zone test cover is in fluid communication with the dual zone chamber downstream of the valve seat. The frame of the dual zone cartridge assembly also includes a valve member to selectively seal against the valve seat in a closed position, and a spring urging the valve member into the closed position.

Another embodiment of the subject technology is directed to a backflow prevention (BFP) assembly including a body forming an upstream bucket and a downstream bucket, wherein flow passes through the body from an inlet to an outlet along an axis and consecutively through each of the upstream and downstream buckets. A single zone test cover encloses a first of the buckets to form a single zone chamber, the single zone test cover having a test cock in fluid communication with the single zone chamber. A single zone cartridge assembly in the first of the buckets includes a frame having a valve seat, a valve member to selectively seal against the valve seat in a closed position, and a spring urging the valve member into the closed position. A dual zone test cover encloses a second of the buckets to form a dual zone chamber. The dual zone test cover has two test cocks and a dual zone cartridge assembly in the second of the buckets. The dual zone test cover includes a frame having a valve seat, wherein the frame includes a lumen providing fluid communication from the dual zone chamber upstream of the valve seat to a first of the two test cocks of the dual zone test cover, and wherein the second of the two test cocks of the dual zone test cover is in fluid communication with the dual zone chamber downstream of the valve seat. A valve member selectively seals against the valve seat in a closed position. A spring urges the valve member into the closed position.

In another embodiment, the subject technology is directed to a backflow prevention (BFP) assembly comprising a body forming an upstream bucket and a downstream bucket. Flow passes through the body from an inlet to an outlet along an axis and each bucket forms a chamber along the axis. A test cover encloses the downstream bucket. The test cover has a downstream test cock for providing a downstream pressure signal. A dual zone test cover encloses the upstream bucket. The dual zone test cover has an intermediate test cock test cock for providing an intermediate pressure signal and an upstream test cock for providing an upstream pressure signal. A downstream cartridge assembly in the downstream bucket selectively opens and closes flow through the downstream bucket. An upstream cartridge assembly in the upstream bucket selectively opens and closes flow through the upstream bucket. The upstream cartridge assembly includes a frame with an upper portion with a valve seat. A lower portion defines a valve seat opening, wherein the lower portion has a wedge-shaped funnel portion that forms a side port aligned with the inlet and is configured to direct incoming fluid flow through the valve seat opening that is set at an angle to the axis. A frame shaft forms a central vertical lumen extending from an upstream pressure zone behind the valve seat to the dual zone test cover for allowing fluid communication between the upstream pressure zone and the upstream test cock. A valve member selectively seals against the valve seat in a closed position. A spring bias assembly normally urges the valve member into the closed position.

In one embodiment, the subject disclosure is directed to a backflow prevention (BFP) assembly comprising a body forming an upstream bucket and a downstream bucket. Flow passes through the body from an inlet to an outlet along an axis and each bucket forms a chamber along the axis. A downstream cartridge assembly is in the downstream bucket to selectively open and close flow through the downstream bucket. An upstream cartridge assembly is in the upstream bucket to selectively open and close flow through the upstream bucket. The upstream cartridge assembly includes a frame including an upper portion and a lower portion defining a valve seat opening, wherein the lower portion has a wedge-shaped funnel portion that forms a side port aligned with the inlet and is configured to direct incoming fluid flow through the valve seat opening that is set at an angle to the axis. Preferably, the body forms a transition neck between the buckets, wherein the transition neck forms an outlet for the upstream bucket and an inlet for the downstream bucket. The downstream cartridge assembly may include a frame including an upper portion and a lower portion defining a valve seat opening, wherein the lower portion has a wedge-shaped funnel portion that forms a side port aligned with the inlet and is configured to direct incoming fluid flow through the valve seat opening that is set at an angle to the axis. In one embodiment, the upper portion of the frame of the upstream cartridge includes a hardstop ring with at least two depending tabs configured to uniquely fit in grooves formed in the upstream bucket, and the upper portion of the frame of the downstream cartridge includes a hardstop ring with at least two depending tabs configured to uniquely fit in grooves formed in the downstream bucket.

In another embodiment, the subject disclosure is directed to a backflow prevention BFP assembly comprising a body forming an upstream bucket and a downstream bucket. A test cover encloses the downstream bucket, the test cover having a downstream test cock for providing a downstream pressure signal. A dual zone test cover encloses the upstream bucket, the dual zone test cover having an intermediate test cock test cock for providing an intermediate pressure signal and an upstream test cock for providing an upstream pressure signal. A downstream cartridge assembly is in the downstream bucket to selectively open and close flow through the downstream bucket. An upstream cartridge assembly is in the upstream bucket to selectively open and close flow through the upstream bucket. The upstream cartridge assembly includes a frame with a valve seat and a shaft forming a central lumen extending from an upstream pressure zone behind the valve seat to the dual zone test cover for allowing fluid communication between the upstream pressure zone and the upstream test cock. A valve member selectively seals against the valve seat in a closed position and a spring bias assembly normally urges the valve member into the closed position. Preferably, the downstream cartridge assembly includes a frame with a similar profile to the upstream cartridge assembly frame but each frame has a hardstop ring with at least two depending tabs configured to uniquely fit in grooves formed in the respective bucket so that the frames can only fit in the proper bucket. The hardstop ring also acts to control an insertion depth into the bucket.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

DETAILED DESCRIPTION

Figure 1:
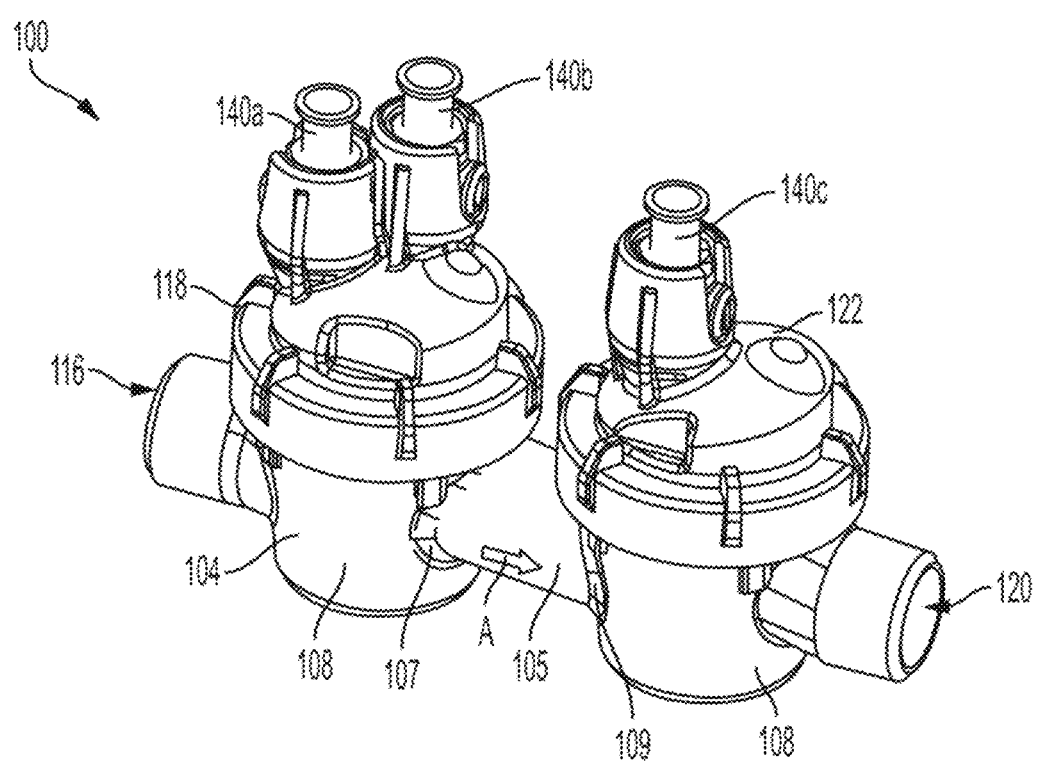
FIG. 1 is a perspective view of a backflow prevention (BFP) assembly in accordance with the present disclosure.

The subject technology overcomes many of the prior art problems associated with backflow prevention assemblies. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Referring now to FIG. 1, there is shown a backflow prevention (BFP) assembly 100 in accordance with an aspect of the present disclosure. The BFP assembly 100 may be installed in a fluid system, e.g., a water supply for a building. In normal operation, the backflow prevention assembly 100 operates to carry fluid in only a forward direction, e.g., left to right in FIG. 3 and as denoted by arrow indicia "A", from an inlet 116 to an outlet 120. The BFP assembly 100 operates to prevent flow in a backward direction, i.e., a direction from right to left in FIG. 3.

The BFP assembly 100 includes a body 104 forming an upstream bucket 108 and a downstream bucket 108. Each bucket 108 forms a chamber 111 (see FIG. 2A) enclosed by a test cover 118, 122. The test covers 118, 122 may include one or more test cocks 140a-c for sensing pressure at various locations within the BFP assembly 100. The upstream test cover 118 includes two test cocks 140a, 140b and the downstream test cover 122 includes a single test cock 140c but the test covers 118, 122 are otherwise very similar. The body 104 forms a transition neck 105 between the buckets 108. On the left, the neck 105 forms an outlet 107 for the upstream bucket 108 and on the right, the neck 105 forms an inlet 109 for the downstream bucket 108. Thus, the valve body 104 forms two bucket chambers 111 with side inlets 109, 116 and side outlets 107, 120. The BFP assembly 100 is normally closed. Water flow passes from the inlet 109 to the outlet 120 and consecutively through each of the buckets 108.

Figure 2A:
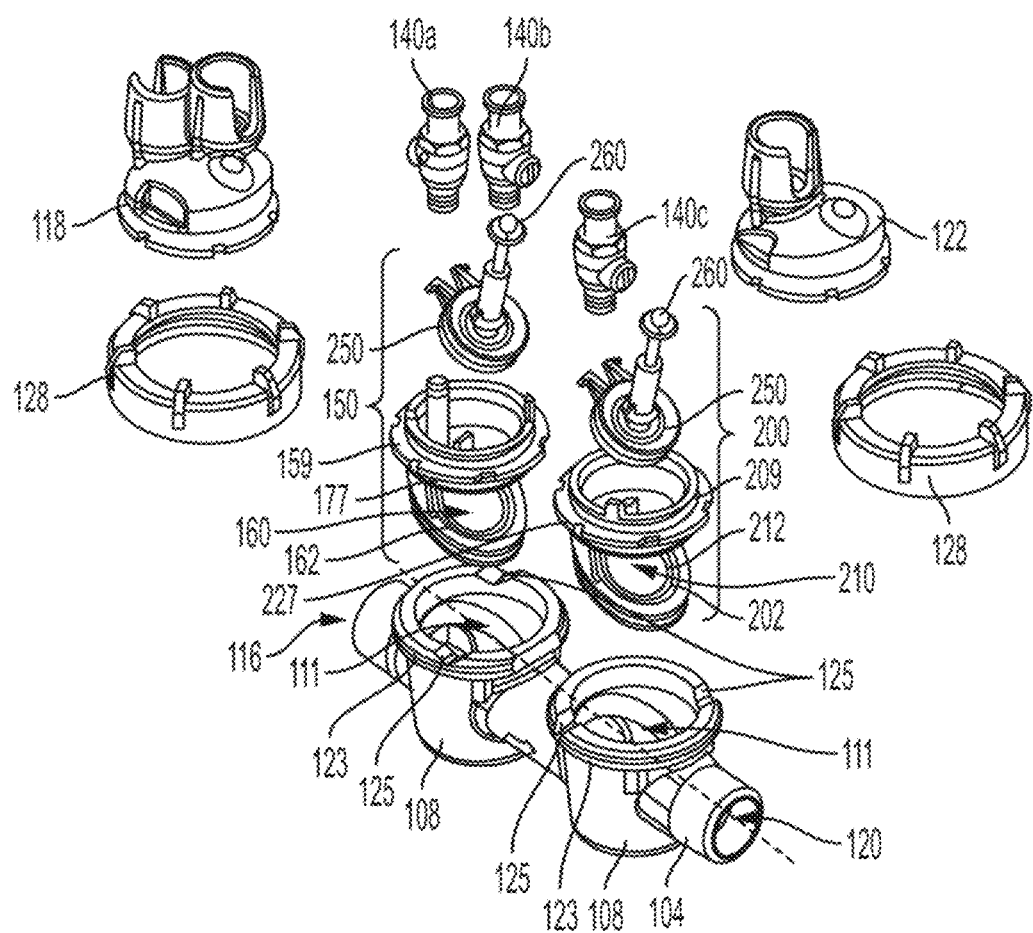
FIG. 2A is an exploded view of the BFP assembly of FIG. 1.
Figure 2B:
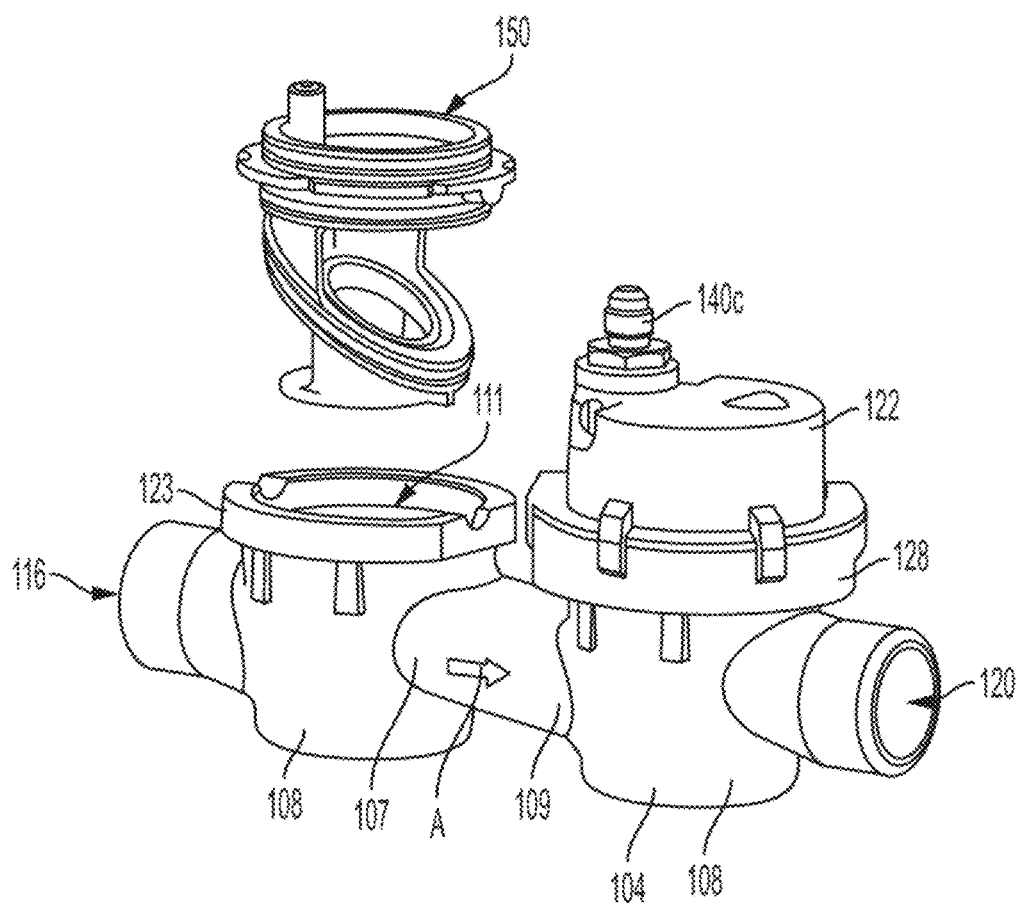
FIG. 2B is a partially exploded view of the BFP assembly of FIG. 1.
Figure 3:
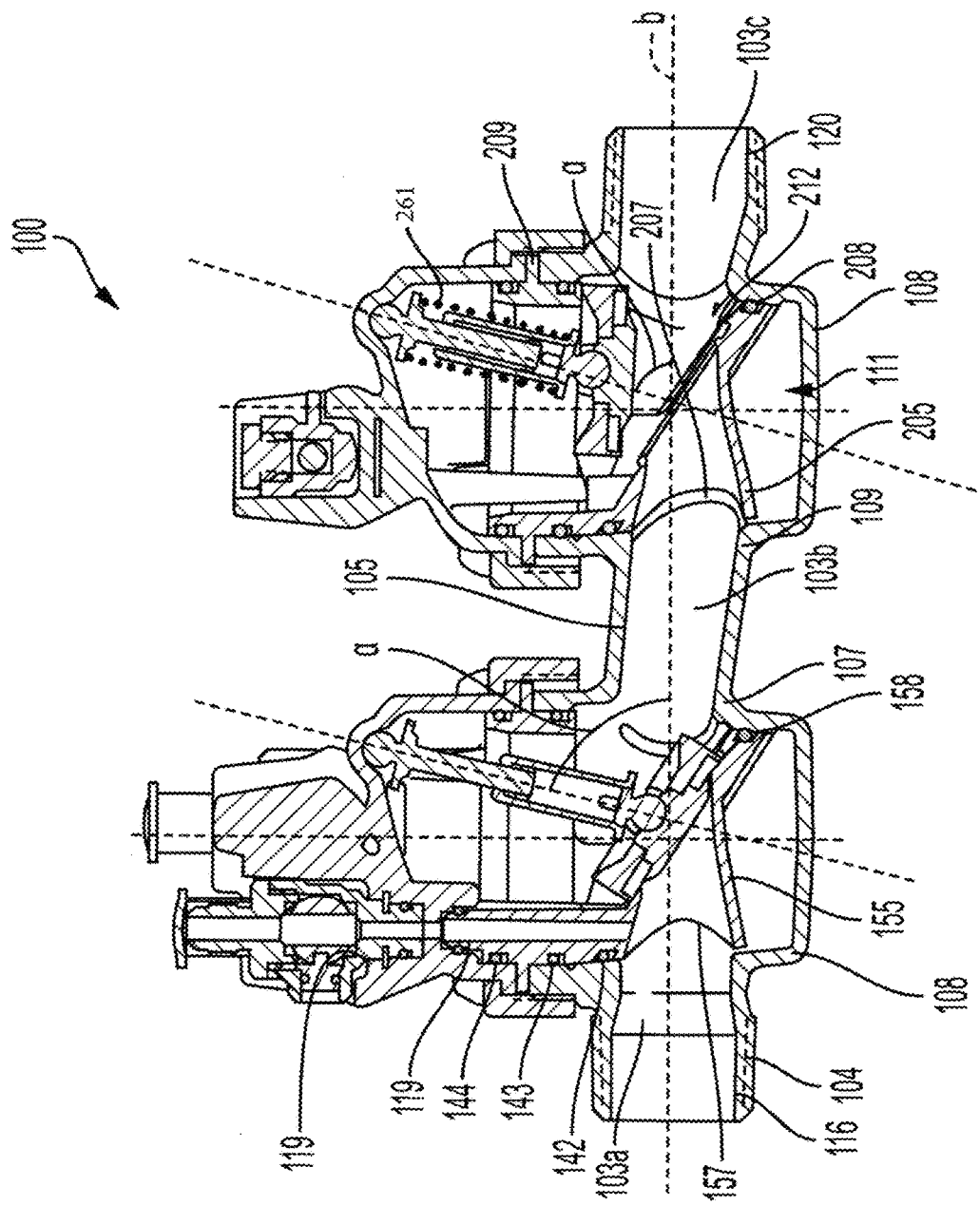
FIG. 3 is cross-sectional view of the BFP assembly of FIG. 1.
Figure 4:
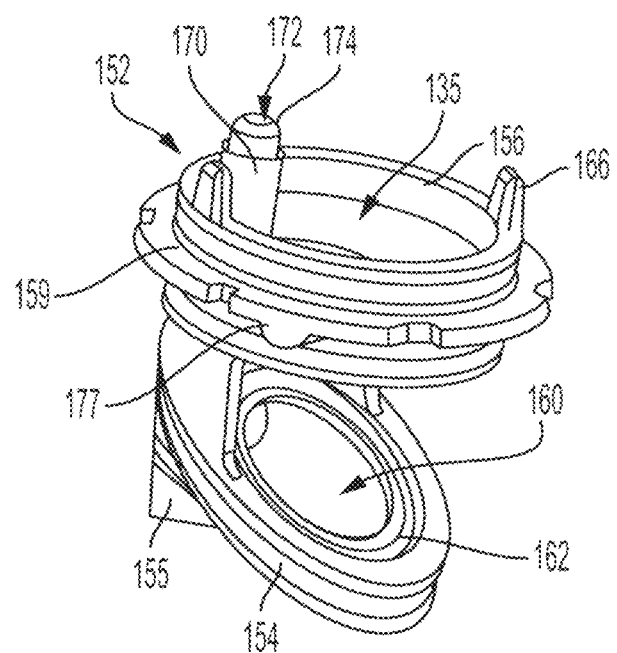
FIG. 4 is a top perspective view of a dual test cock frame for a check valve cartridge assembly for a BFP assembly in accordance with the present disclosure.
Figure 6:
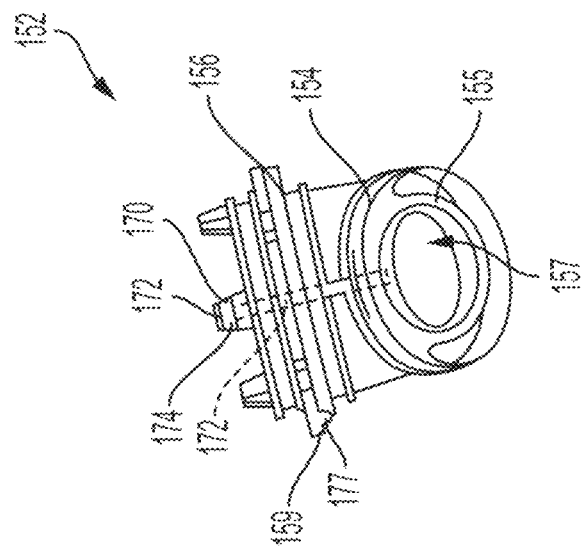
FIG. 6 is a bottom perspective view of the frame of FIG. 4.
Figure 5:
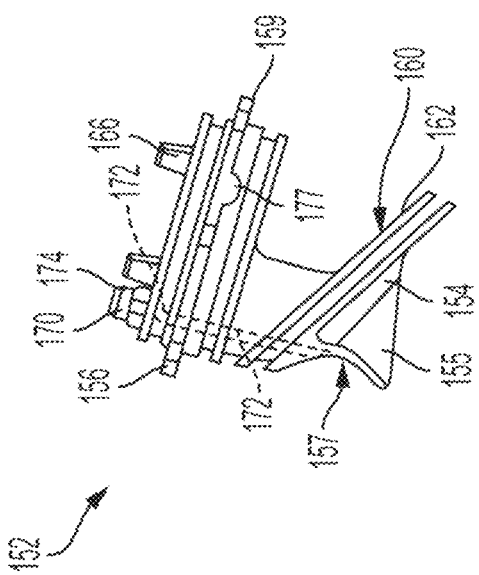
FIG. 5 is a side view of the frame of FIG. 4.

Referring now to FIGS. 2A, 2B and 3, exploded views and a cross-sectional view of the BFP assembly 100 of FIG. 1 are shown. The BFP assembly 100 has an upstream cartridge assembly 150 and a downstream cartridge assembly 200 that fit within the respective bucket 108 to create check valves for selectively opening and closing flow through the body 104. The upstream cartridge assembly 150 creates a single zone chamber 111 and the downstream cartridge assembly 200 creates a dual zone chamber 111.

More particularly, each cartridge assembly 150, 200 has a frame 152, 202 with a lower portion 154, 204 and an upper portion 156, 206. The lower portion 154, 204 carries an o-ring 158, 208 that seals against the bucket 108 so that all fluid flow passes through an opening 160, 210 formed in the respective lower portion 154, 204. The frames 152, 202 are different as discussed in more detail below with respect to FIGS. 4-8.

Each cartridge assembly 150, 200 includes an interchangeable valve member 250 mounted to the frame 152, 202. The valve member 250 selectively closes on to a valve seat 162, 212 surrounding the opening 160, 210. When the valve member 250 seals against the valve seat 162, 212, the check valve is closed. Each cartridge assembly 150, 200 includes a spring bias assembly 260 to normally urge each valve member 250 into the closed position. However, the closing force of the spring bias assembly 260 is typically overcome by normal pressure of the flowing fluid. The spring bias assembly 260 extends between the valve member 250 and the respective test cover 118, 122. The spring bias assembly 260 is typically compressed with a spring 261 (see FIG. 3) that urges the spring bias assembly 260 to extend. Only one spring 261 is shown for simplicity.

When the cartridge assemblies 150, 200 are closed, the BFP assembly 100 creates three different pressure zone 103a-c. The upstream zone 103a is basically at the source pressure and extends up to the first valve seat 162. The intermediate zone 103b is between the valve seats 162, 212. The downstream zone 103c is basically at the output pressure and extends from the second valve seat 212. Test cocks 140a-c sense the pressure in each zone 103a-c, respectively.

Still referring to FIGS. 2 and 3, to assembly the BFP assembly 100, the cartridge assemblies 150, 200 are placed in the buckets 108. The upper portions 156, 206 of the frames 152, 202 include hardstop rings 159, 209. The hardstop rings 159, 209 seat against the buckets 108 to set a depth of insertion. The hardstop rings 159, 209 also include depending tabs 177, 227 that rest in grooves 125 formed in threaded portions 123 of the buckets 108. As the tabs 177, 227 and the grooves 125 for each bucket are different, assembly of the wrong cartridge assembly 150, 200 in the wrong bucket 108 is prevented.

Once the cartridge assemblies 150, 200 are in place within the buckets 108, the test covers 118, 122 enclose the buckets 108 while creating a stop for the spring bias assembly 260. In other words, the spring bias assemblies 260 extend from the respective test cover 118, 122 to push against the valve member 250. A coupling ring 128 screws on to a threaded portion 123 of each bucket 108 to secure the components 118, 122, 150, 200 in place. The coupling rings 128 are designed to be hand tightened.

Referring now to FIGS. 4-8, various views of a dual test cock frame 152 are shown. The lower portion 154 has a wedge-shaped funnel portion 155 that forms a side inlet port 157. The size and shape side port 157 matches up with and aligns to the body inlet 116. As a result, the incoming fluid flow is directed to the valve seat opening 160. The lower portion 154 sets flow through the valve seat opening 160 at an angle α to the overall direction of flow as shown by axis line "b" in FIG. 3. The valve seat 162 also carries a first o-ring 142 that seals against the body 104.

Turning to the upper portion 156 of the frame 152, the upper portion 156 carries a second o-ring 143 that seals against the body 104 and a third o-ring 144 that seals against the test cover 118. The frame 152 also has optional opposing upstanding handles 166 to facilitate manual insertion and removal of the cartridge assembly 150 from the bucket 108. An upper aperture 135 lets the spring bias assembly 260 extend upward past the frame 156. The upper aperture 135 also lets the intermediate zone 103b extend up against the test cover 118. The test cock 140b mounts in the test cover 118 to be in fluid communication with the intermediate zone 103b. As a result, the test cock 140b can provide a signal indicative of the pressure in the intermediate zone 103b.

To acquire a signal indicative of the pressure in the upstream zone 103a, the frame 156 has a shaft 170 with a central lumen 172. The shaft 170 extends from the lower portion 154 up above the hard stop ring 159 and terminates in a nipple 174. The test cover 118 has a port 119 that couples to the nipple 174 for allowing fluid communication from the lumen 172 to the test cock 140a, which is also installed in the port 119. At the lower portion 154, the central lumen 172 terminates below the valve seat 162 in the upstream zone 103a. Thus, the test cock 140a is in fluid communication with the upstream zone 103a.

Figure 9:
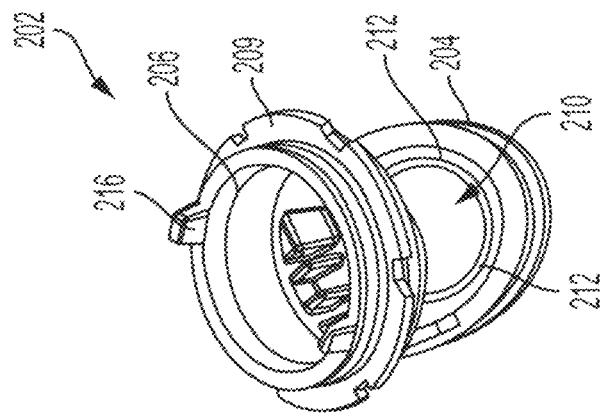
FIG. 9 is a top perspective view of a single test cock frame for a check valve cartridge assembly for a BFP assembly in accordance with the present disclosure.
Figure 8:
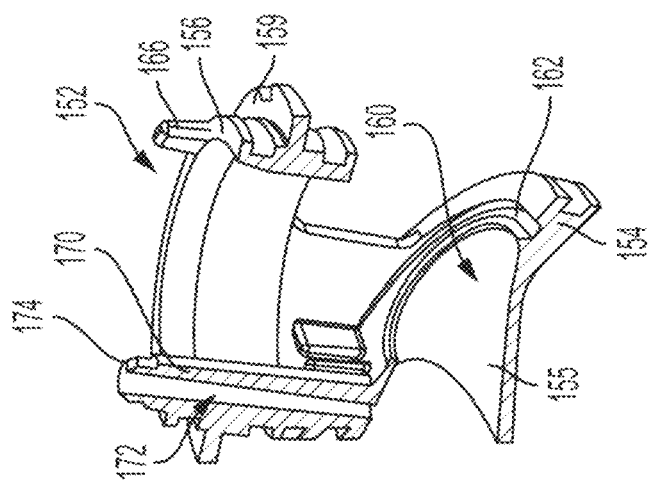
FIG. 8 is a cross-sectional view of the frame of FIG. 4.
Figure 7:
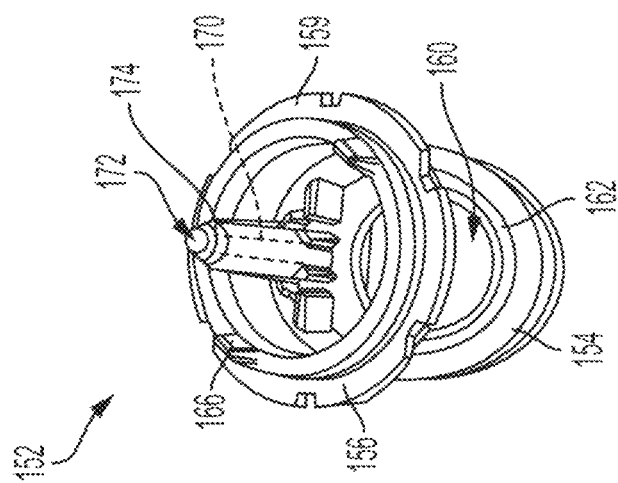
FIG. 7 is another top perspective view of the frame of FIG. 4.

Referring now to FIG. 9, a top perspective view of a single test cock frame 202 for a BFP assembly 100 in accordance with the present disclosure is shown. The single test cock frame 202 is similar to the dual test cock frame 152 but does not have a lumen 172. The similar parts are labeled with a reference numeral fifty digits higher. Preferably, the frames 152, 202 have similar silhouettes. The lower portion 204 also has a wedge-shaped funnel portion 205 that forms a side inlet port 207. The size and shape side port 207 matches up with and aligns to the inlet 109 of the body 108, which is aligned with the inlet 116. Again, the incoming fluid flow is directed to the valve seat opening 210, which is set at an angle α to the overall direction of flow as shown by axis line "b" in FIG. 3. By having the check valve assemblies not horizontally oriented like the flow direction, the resulting BFP assembly is very compact. Also, by having a dual zone test cover, the BFP assembly is further compacted.

To assemble the BFP assembly 100, the cartridge assemblies 150, 200 are assembled separately. The completed cartridge assemblies 150, 200 are pressed into the respective bucket 108 until the hard stop rings 159, 209 seat on to the bucket 108. The handles 172, 21 provide a nice hand grip and easy ability to rotate until the tabs 177, 227 are in the corresponding grooves 125 and the hard stop rings 159, 209 are properly seated against the buckets 108.

The respective test covers 118, 122 are then placed over the cartridge assemblies 150, 200. The coupling rings 128 are then tightly threaded on to the buckets 108 to fix the components in place. At this time, the test cocks 140a-c can be installed in the test covers 118, 122 but the test cocks 140a-c may also be pre-installed.

In normal operation, the force exerted by the respective spring retainer assembly 260 on the valve elements 250 is overcome by the pressure exerted by the fluid normally flowing from the inlet 116 to the outlet 120 so that both check valves 150 are open. If, for example, there is a drop in pressure from the supply source, the upstream valve element 250 and/or the downstream valve 250 will close to prevent backflow contamination. Similarly, if the normal forward flow is interrupted, one or both of the valve elements 250 is urged in position to cover the valve seats 162, 212 to close the BFP assembly 100 and prevent backflow. The test cocks 140a-c are used to verify proper operation during testing.

As can be seen upon review of the subject disclosure, the lumen in the frame saves space and manufacturing costs for a BFP assembly. It is also much easier to create a vertical chamber in the typically plastic frame for a lumen than to have such through a typically brass body. Further, the side inlet ports and angled radial seal are against common wisdom but beneficially serve to reduce the lay length of the BFP assembly. Still further, repair is also simplified by being able to fully preassemble the cartridge assembly, and conduct a complete swap without tools. Further, the subject technology can be adapted to any kind of valve.

In another embodiment, the dual zone test cover and dual zone cartridge assembly are on the downstream bucket for testing the downstream zone and the intermediate zone. The upstream bucket has a single zone test cover and single zone cartridge assembly with the frame forming a lumen so that the upstream zone can be tested. One way to accomplish this is for the same cartridge assembly to be used in both buckets and a single test cock on the upstream test cover is in communication with the lumen.

In still another embodiment, the upstream test cock mounts in the body and the upstream test cover is simplified by not having a test cock at all. To still provide second and third test cocks to check all the zones, the downstream test cover has two test cocks with a frame having a lumen from the intermediate zone to one of the test cocks.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements (e.g., check valves, valve elements, spring retention assemblies, and the like) shown as distinct for purposes of illustration can be incorporated within other functional elements in a particular implementation.

While the subject technology has been described with respect to various embodiments, those skilled in the art will readily appreciate that various changes and/or modifications can be made to the subject technology without departing from the scope of the present disclosure.

What is claimed is:

1. A backflow prevention (BFP) assembly comprising:
  a body forming an upstream bucket and a downstream bucket, wherein flow passes through the body from an inlet to an outlet along an axis and consecutively through each of the upstream and downstream buckets;
  a single zone test cover enclosing a first of the buckets to form a single zone chamber, the single zone test cover having a test cock in fluid communication with the single zone chamber;
  a single zone cartridge assembly in the first of the buckets including,
    a frame having a valve seat,
    a valve member to selectively seal against the valve seat in a closed position, and
    a bias assembly urging the valve member into the closed position;
  a dual zone test cover enclosing a second of the buckets to form a dual zone chamber, the dual zone test cover having two test cocks; and
  a dual zone cartridge assembly in the second of the buckets including,
    a frame having a valve seat, wherein the frame includes a lumen providing fluid communication from the dual zone chamber upstream of the valve seat to a first of the two test cocks of the dual zone test cover, and wherein the second of the two test cocks of the dual zone test cover is in fluid communication with the dual zone chamber downstream of the valve seat,
    a valve member to selectively seal against the valve seat in a closed position, and
    a bias assembly urging the valve member into the closed position.

2. A BFP assembly as recited in claim 1, wherein the first of the buckets is downstream of the second of the buckets.

3. A BFP assembly as recited in claim 1, wherein the body forms a transition neck between the buckets, the transition neck forming an outlet for the upstream bucket and an inlet for the downstream bucket.

4. A BFP assembly as recited in claim 2, wherein each cartridge assembly includes: the frame including an upper portion and a lower portion defining a valve seat opening, wherein the lower portion has a wedge-shaped funnel portion that forms a side port aligned with the inlet and is configured to direct incoming fluid flow through the valve seat opening that is set at an angle to the axis.

5. A BFP assembly as recited in claim 1, wherein:
  the single zone cartridge assembly includes the frame having a hardstop ring with at least one depending tab configured to uniquely fit in a groove formed in the first of the buckets; and
  the dual zone cartridge assembly includes the frame having a hardstop ring with at least one depending tab configured to uniquely fit in a groove formed in the second of the buckets.

6. A BFP assembly as recited in claim 5, wherein each hardstop ring limits an insertion depth thereof into the bucket.

7. A backflow prevention BFP assembly comprising:
a body forming an upstream bucket and a downstream bucket;
a test cover enclosing the downstream bucket, the test cover having a downstream test cock for providing a downstream pressure signal;
a dual zone test cover enclosing the upstream bucket, the dual zone test cover having an intermediate test cock test cock for providing an intermediate pressure signal and an upstream test cock for providing an upstream pressure signal;
a downstream cartridge assembly in the downstream bucket to selectively open and close flow through the downstream bucket; and
an upstream cartridge assembly in the upstream bucket to selectively open and close flow through the upstream bucket, wherein the upstream cartridge assembly includes: a frame with a valve seat and a shaft forming a central lumen extending from an upstream pressure zone upstream of the valve seat to the dual zone test cover for allowing fluid communication between the upstream pressure zone and the upstream test cock; a valve member to selectively seal against the valve seat in a closed position; and a bias assembly to normally urge the valve member into the closed position.

8. A BFP assembly as recited in claim 7, wherein the downstream cartridge assembly includes a frame with a valve seat; a valve member to selectively seal against the valve seat in a closed position; and a spring bias assembly to normally urge the valve member into the closed position, each frame having a hardstop ring with at least one depending tab configured to uniquely fit in at least one groove formed in the respective bucket so that the frames can only fit in the proper bucket and each hardstop ring engages the bucket to control an insertion depth thereof into the bucket.

* * * * *